O. D. RICHARDSON.
TRACTION VEHICLE.
APPLICATION FILED FEB. 21, 1918.
1,342,761.
Patented June 8, 1920.
3 SHEETS—SHEET 1.
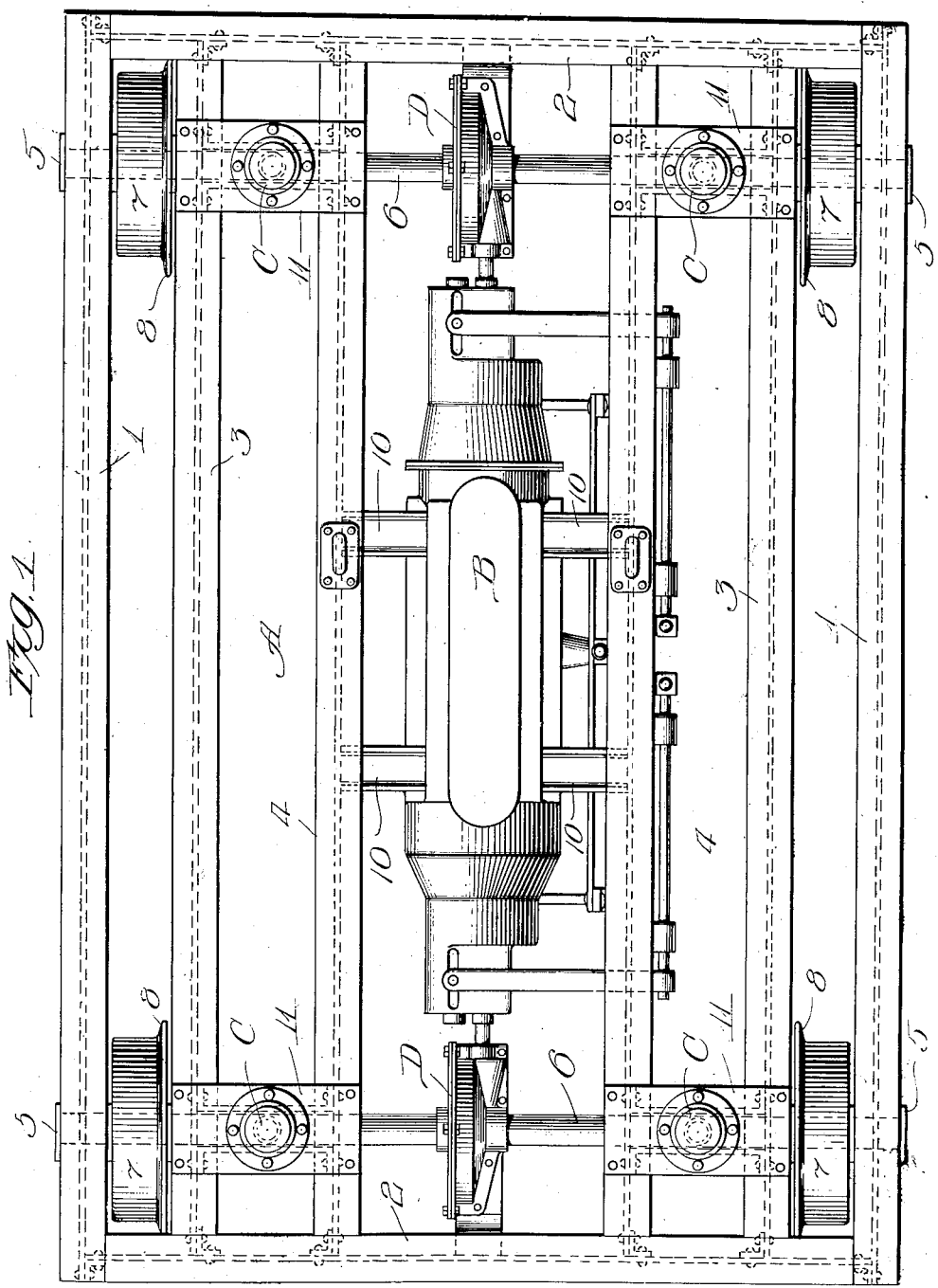
Witness:
Harry S. Gaither
Inventor:
Orlo D. Richardson
by Taylor Brown Atty

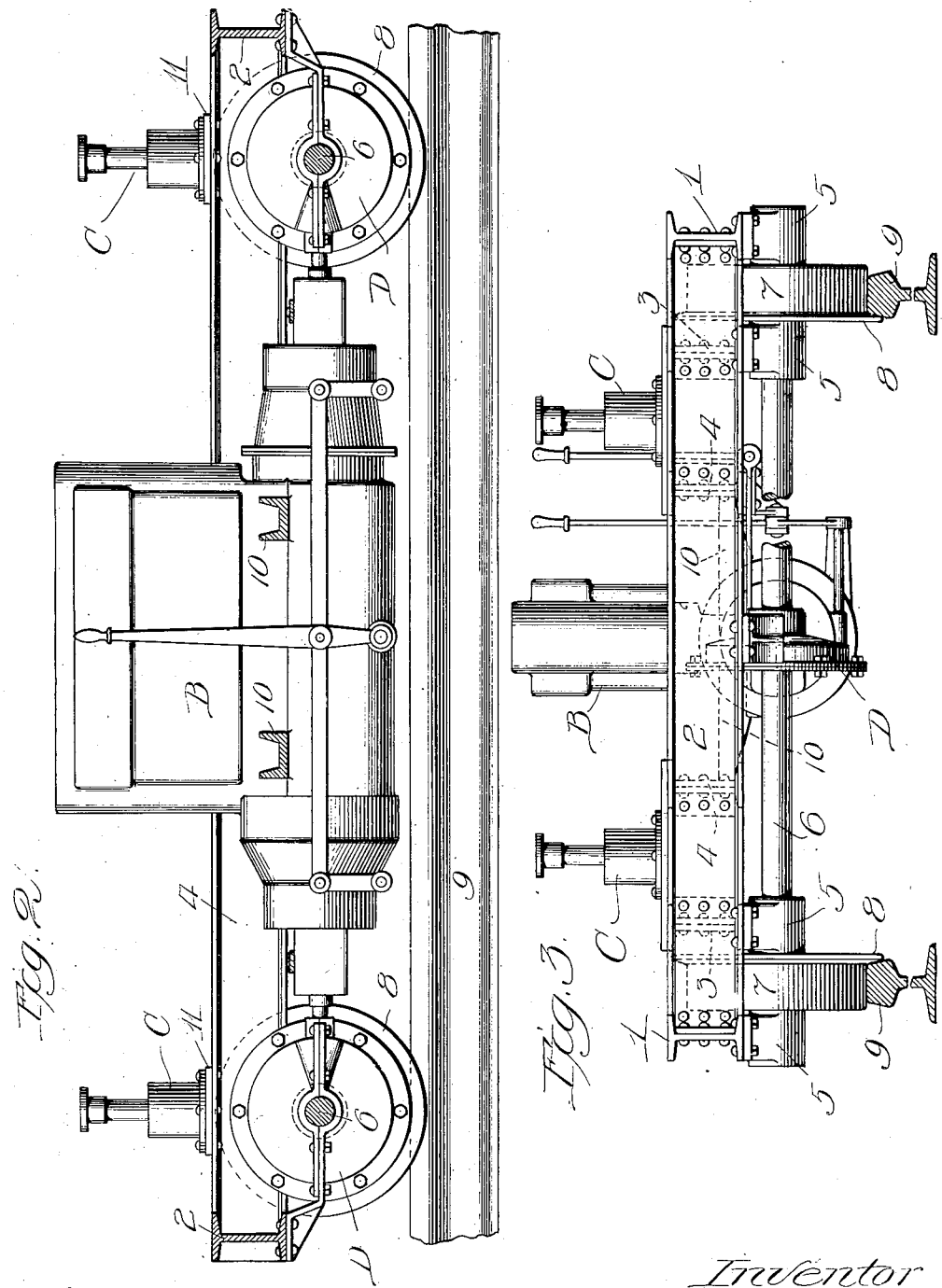

O. D. RICHARDSON.
TRACTION VEHICLE.
APPLICATION FILED FEB. 21, 1918.
1,342,761.
Patented June 8, 1920.
3 SHEETS—SHEET 3.
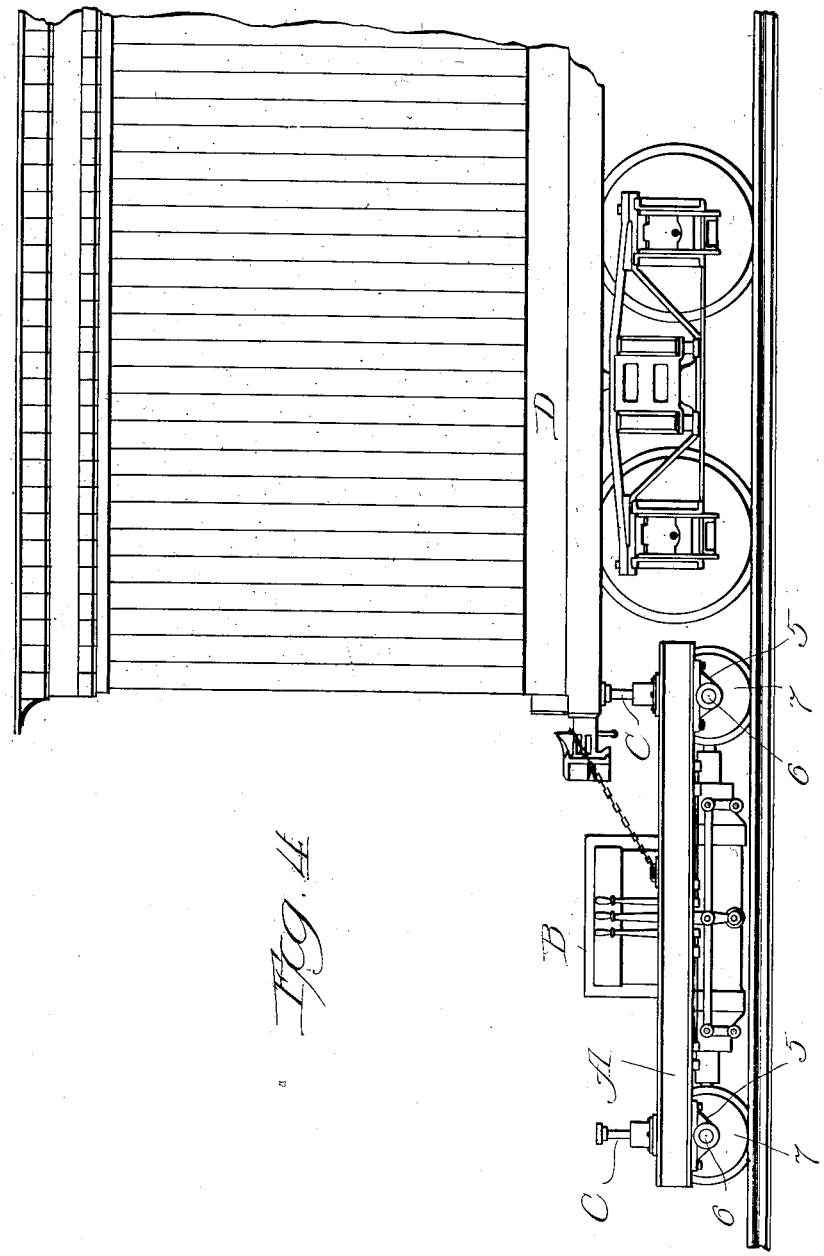
Witness:
Harry S. Gaither
Inventor:
Orlo D. Richardson

UNITED STATES PATENT OFFICE.

ORLO D. RICHARDSON, OF CHICAGO, ILLINOIS.

TRACTION-VEHICLE.

1,342,761.　　　　　Specification of Letters Patent.　　Patented June 8, 1920.

Application filed February 21, 1918. Serial No. 218,412.

*To all whom it may concern:*

Be it known that I, ORLO D. RICHARDSON, a citizen of the United States, and a resident of Chicago, in the county of Cook and State of Illinois, have invented certain new and useful Improvements in Traction-Vehicles; and I do hereby declare that the following is a full, clear, and exact description thereof, reference being had to the accompanying drawings, and to the letters of reference marked thereon, which form a part of this specification.

This invention relates to improvements in traction vehicles designed primarily to be used as motor cars for switching heavy freight or other cars over railway tracks and for moving heavily loaded trucks in industrial plants and yards; and for other purposes, as will hereinafter be made more apparent.

In the handling and switching of heavy cars on railway tracks, for example, particularly loaded cars, where freight or switching engines are not readily available, it has been the custom to use manually operated levers, usually of special construction, or else to employ the manual power of a large number of laborers. In both instances, the time and expense of switching the car is considerable. It is also a matter of undue expense to have switch engines employed for this purpose.

The primary object of my invention is to provide a traction vehicle which will utilize a portion of the weight of a car or heavy object to be moved, to give the necessary traction to the drive wheels of the traction vehicle, whereby the latter will be enabled to readily haul or transfer the car from one location to another. Another object of the invention is to construct a small, relatively light weight, motor truck or vehicle, provided with means for operating it (preferably a power plant mounted thereon), which will be so relatively cheap in initial cost as to enable the persons having use for such articles, to employ a plurality of them at much less overhead expense than would be occasioned by the employment of switch engines on the one hand, or the use of a large number of laborers, on the other hand.

In use, such a light, easily running vehicle will be placed in juxtaposition to the heavy object to be moved and then coupled up thereto. After moving the light vehicle to the heavier object to be moved or shifted, the forward end of the latter will then be raised such an appreciable extent as to cause a very considerable portion of the weight of the car and its contents to be transferred to the light traction vehicle and to bear down upon the adjacent traction wheels thereof, so as to afford the necessary traction for the light vehicle. It will be found that the light vehicle may then be readily moved by hand or by its own power and that it will draw the heavier vehicle along with it with comparative ease, so that the latter may be shifted to the desired change of location. The invention will be more readily comprehended by reference to the accompanying drawings, in which I have depicted one form of embodiment of my invention.

In said drawings:

Figure 1 illustrates in a top, plan view, a traction vehicle embodying my invention, with a conventional type of power plant and other features mounted thereon.

Fig. 2 is a longitudinal, vertical, sectional view of the same, taken upon the line 2—2 of Fig. 1.

Fig. 3 is an end elevation of the car.

Fig. 4 is a side elevation of a portion of a standard type freight car showing the traction car of my invention in juxtaposition thereto and connected with said car.

Referring now to Figs. 1, 2 and 3.—A represents the vehicle as a whole. The frame of this form of vehicle, which I have selected to illustrate my invention, is composed of a plurality of longitudinally extending side sills 1, preferably of conventional I-beam form. These are riveted or otherwise suitably connected together by suitable cross beams 2, 2, one at each end of the structure. Intermediate the cross beams and preferably arranged in pairs, as shown, are longitudinally extending strengthening sills 3, 4, suitably secured to the end beams 2, 2 by rivets or other means. Journal boxes 5, 5, suitably mounted on the lower side of and secured to the side sills 1, 1, and the strengthening sills 3, 3, afford convenient bearings for the driving axles 6, 6, each carrying near its outer end a traction wheel 7,—the traction wheels being located as shown in this particular type between the side sills 1, and the strengthening sills 3. When the vehicle is to be used on a laid track, these traction wheels will have flanges 8 to conform to the rails 9.

B represents any conventional form of power plant mounted upon cross bars 10, 10, secured to and transversely of the adjacent, longitudinal sills 4, 4. The motor plant B is operatively connected at D with the driving axle 6. I prefer, and in the illustration, I have shown a double motor plant so that the vehicle may be driven by applying power to either axle.

At the end of the vehicle, I provide a suitable lifting device, such as a lifting jack, preferably power driven, designated as a whole by the letter C. Each lifting jack is mounted upon a platform plate 11, laid transversely of and secured to the top of the longitudinal sills, 3—4, immediately above the drive axle 6. It will be readily understood from the foregoing description that the light traction vehicle is first moved into position under the relatively heavy object to be moved. The jacks C are then operated to raise the load an appreciable extent such as to cause a very considerable portion of the weight of the load to be transferred directly to the traction wheels 7 of the vehicle. It will be noted that said wheels are journaled immediately below the lifting jacks C and in vertical alinement with the axis thereof, whereby any tipping action of the traction vehicle under the relatively heavy load imposed thereupon is entirely prevented and additional traction thus imparted to the traction wheels.

Inasmuch as the details of the motor power plant, lifting device and means for operating the same, separately considered, form no part of the present invention, I have illustrated the same only in a diagrammatic way and further description thereof will be omitted.

Referring to Fig. 4, it will be observed that the traction vehicle A has been moved in juxtaposition to the end of the freight car D, of standard type, so that the proximate end of the vehicle and its driving axle 6 and traction wheels 7 are vertically beneath that portion of the freight car extending forwardly of and beyond the car truck frame and wheels. The lifting jacks C are illustrated as having been operated and raised so as to lift the body of the freight car D to some extent, relieving some of the weight from the car truck frame and transferring a considerable portion of the weight of the freight car through the medium of the lifting jacks, to the traction vehicle A and its driving axles and wheels.

It will be necessary, in order to effect this condition, to provide the traction vehicle A with wheels of relatively small diameter and to make the platform or frame of the traction vehicle relatively low, so that it may be passed under the bottom of the normal or standard freight car, sufficiently to permit of the lifting device being placed in operative position beneath the freight car to raise the latter.

In the instance shown in Fig. 4, the freight car D and the traction vehicle A are shown as being locked in the position illustrated, by means of an ordinary link chain 12 looped about the coupler 13 of the freight car D, the ends of the chain being secured to hooks 14, 14 on the top of the vehicle frame sills 4, 4. Manifestly other means of holding the vehicle and car in operative relation may be employed.

Having moved the relatively light vehicle A with its relatively small power motor into the position illustrated in Fig. 4, and having operated the lifting jacks and transferred a considerable portion of the weight of the car D and its contents, which may be anywhere from ten to twenty times the weight of the small vehicle, from the wheels of the car to the wheels of the small vehicle, I find that upon the application of power to the small vehicle, the latter has sufficient traction on its driving wheels to readily respond to its light motive power, will move upon the track easily, and will pull the heavy freight car with it with comparative ease and facility.

I have not undertaken to illustrate or describe all of the various details and modifications that may be made in the construction of a light, low-platformed, small-wheeled traction vehicle, adapted for the purposes mentioned, since it will be readily understood that many modifications and changes may be made from the form illustrated. For example, instead of coupling the car and the vehicle together by the chain illustrated, it is manifest that other equivalent devices may be used.

While I have made reference to a "standard" type of car, it will be noted that my improved traction vehicle is adapted for use with other types and styles of cars and trucks, including, for example, the familiar gondola or dump cars. In some types of car, the constructions may not afford a convenient place beneath the car frame for my lifting device, in which event, the jack C will be placed beneath the car coupler or the car coupler housing, and will operate in the same manner as above described.

The arrangement of my vehicle must in all cases be such that it will afford means for the lifting device thereon to engage some part of the car or other object to be moved, so that the lifting device will function, as described.

It is also manifest that the lifting jacks may be elevated by many of the common, commercial-form of pawl and ratchet lifting devices, and may be operated by hydraulic or other power. All of these and other modifications, I desire to be comprehended within the scope of my invention, since the essential feature thereof is the construction of a relatively light weight but strong, relatively cheap, low-platformed, small-wheeled traction vehicle, adapted to be placed under the end of a relatively heavy car to be moved, and which light vehicle is provided with means for so raising the heavy car as to transfer a portion of the weight thereof to the light vehicle and at the same time provide means for operating the vehicle and moving the car.

I claim as my invention:

1. A traction vehicle of relatively light construction provided with a relatively low power operating device, drive wheels journaled adjacent one end thereof, means on the vehicle disposed immediately above and in vertical alinement with the axis of said drive wheels, whereby a portion of the weight of a movable object may be transferred to said vehicle to afford additional traction to its driving wheels and means for holding the movable object and said vehicle in operative relation when the vehicle is moved.

2. A motor truck of relatively light construction providing means immediately above and in vertical alinement with the axis of its traction wheels for supporting thereon one end of a car in such manner that a portion of the weight of the car and its load will be directly transmitted to the traction wheels at one end of the truck, means for operatively securing the car to the truck while the latter is moving the former, and means for operating the truck.

3. A traction vehicle of relatively light construction adapted at one end to be passed close to the truck frame of a railway car and engage the end of said car, means for operatively connecting the vehicle and the car, means for causing a portion of the weight of the car to be transmitted to the traction wheels of the vehicle, said means being disposed immediately above and in vertical alinement with the axis of the traction wheels adjacent the end of the vehicle to support the weight, and means for operating the traction vehicle.

4. A traction vehicle of relatively light construction, a relatively low platform at one end thereof adapted to be passed below the floor of a standard railroad car, traction wheels journaled adjacent the end of said platform, means on the vehicle platform disposed immediately above the axis of said traction wheels and adapted to engage and raise the said car and thereby transfer a portion of the weight from the car to the vehicle to give increased traction to the latter, means for operatively connecting the car and the vehicle and means for operating the vehicle.

5. A railroad traction vehicle of relatively light construction adapted at one end to be passed below the floor of a standard railroad car, traction wheels journaled adjacent said end, a lifting jack on said vehicle mounted immediately above the axis of said traction wheels adapted to engage and raise the car end whereby a portion of the weight on the car truck will be shifted to the traction wheels of the vehicle and a relatively light power plant on the vehicle adapted to operate the latter and move the car with it, and means for holding the vehicle and car in operative relation.

6. A wheeled traction vehicle of relatively light platform construction and provided with a relatively low power-plant, a lifting device on the vehicle platform, said platform being of such height as to afford ample operative space between it and an engaging surface on a car or other object to be moved by the vehicle, traction wheels journaled in said platform immediately below said lifting device, whereby when the lifting device is operated, a portion of the load of said car will be transferred directly to wheels and means for holding the car and the vehicle in operative relation when the latter is moving the former.

In testimony that I claim the foregoing as my invention I affix my signature, in the presence of two witnesses, this 18th day of February, A. D. 1918.

ORLO D. RICHARDSON.

Witnesses:
 TAYLOR C. BROWN,
 BERTHA L. MACGREGOR.